(12) United States Patent
Fantaske et al.

(10) Patent No.: US 10,277,451 B2
(45) Date of Patent: Apr. 30, 2019

(54) CONTROL METHOD AND APPARATUS IN A MOBILE AUTOMATION SYSTEM

(71) Applicant: SYMBOL TECHNOLOGIES, LLC, Lincolnshire, IL (US)

(72) Inventors: Steve W. Fantaske, Toronto (CA); Ronald G. Mercer, Guelph (CA); Robert E. Beach, Los Altos, CA (US); Jagdeep Kaur Rangi, Mississauga (CA)

(73) Assignee: Symbol Technologies, LLC, Holtsville, NY (US)

( * ) Notice: Subject to any disclaimer, the term of this patent is extended or adjusted under 35 U.S.C. 154(b) by 37 days.

(21) Appl. No.: 15/698,397

(22) Filed: Sep. 7, 2017

(65) Prior Publication Data
US 2019/0075009 A1    Mar. 7, 2019

(51) Int. Cl.
| | |
|---|---|
| G06F 15/16 | (2006.01) |
| H04L 29/04 | (2006.01) |
| H04L 29/10 | (2006.01) |
| H04L 29/08 | (2006.01) |
| H04L 29/06 | (2006.01) |

(52) U.S. Cl.
CPC ........ *H04L 29/04* (2013.01); *H04L 29/08567* (2013.01); *H04L 29/10* (2013.01); *H04L 29/06163* (2013.01); *H04L 29/08819* (2013.01)

(58) Field of Classification Search
CPC ... H04L 29/04; H04L 29/10; H04L 29/08567; H04L 29/08819; H04L 29/06163
USPC .................................................. 709/217, 226
See application file for complete search history.

(56) References Cited

U.S. PATENT DOCUMENTS

2014/0047342 A1 *   2/2014   Breternitz ............. G06F 9/5061
                                                               715/735
2014/0344401 A1 *  11/2014   Varney ................ H04L 67/1097
                                                               709/217

* cited by examiner

*Primary Examiner* — Phuoc H Nguyen

(57) ABSTRACT

A control method includes: storing, at a control server, respective identifiers for a plurality of sub-regions in a facility; for each sub-region identifier, a location of the sub-region in the facility and an operational constraint associated with a mobile automation apparatus; at the control server: obtaining a job definition indicating a set of the sub-region identifiers and a task; retrieving the locations and the operational constraints corresponding to the set of sub-region identifiers from the repository; allocating the set of sub-region identifiers to a plurality of subsets of sub-region identifiers, each subset having a shared common operational constraint; for each subset of sub-region identifiers, generating a task fragment containing the subset of sub-region identifiers, and the common operational constraint; and sending the task fragments and an identifier of the task to the mobile automation apparatus for performance of the task at each of the set of sub-region identifiers.

8 Claims, 8 Drawing Sheets

CONTROL METHOD AND APPARATUS IN A MOBILE AUTOMATION SYSTEM

BACKGROUND

Environments in which objects are managed, such as retail facilities, may be complex and fluid. For example, a retail facility may include objects such as products for purchase, a distribution environment may include objects such as parcels or pallets, a manufacturing environment may include objects such as components or assemblies, a healthcare environment may include objects such as medications or medical devices. A mobile apparatus may be employed to perform tasks within the environment, such as capturing data for use in identifying products that are out of stock, incorrectly located, and the like. However, the presence of customers and the complexity of the environments introduces difficulties in task assignment and execution for the mobile apparatus. For example, obstacles may interrupt the performance of the task, which may result in the need to abandon or restart the task.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
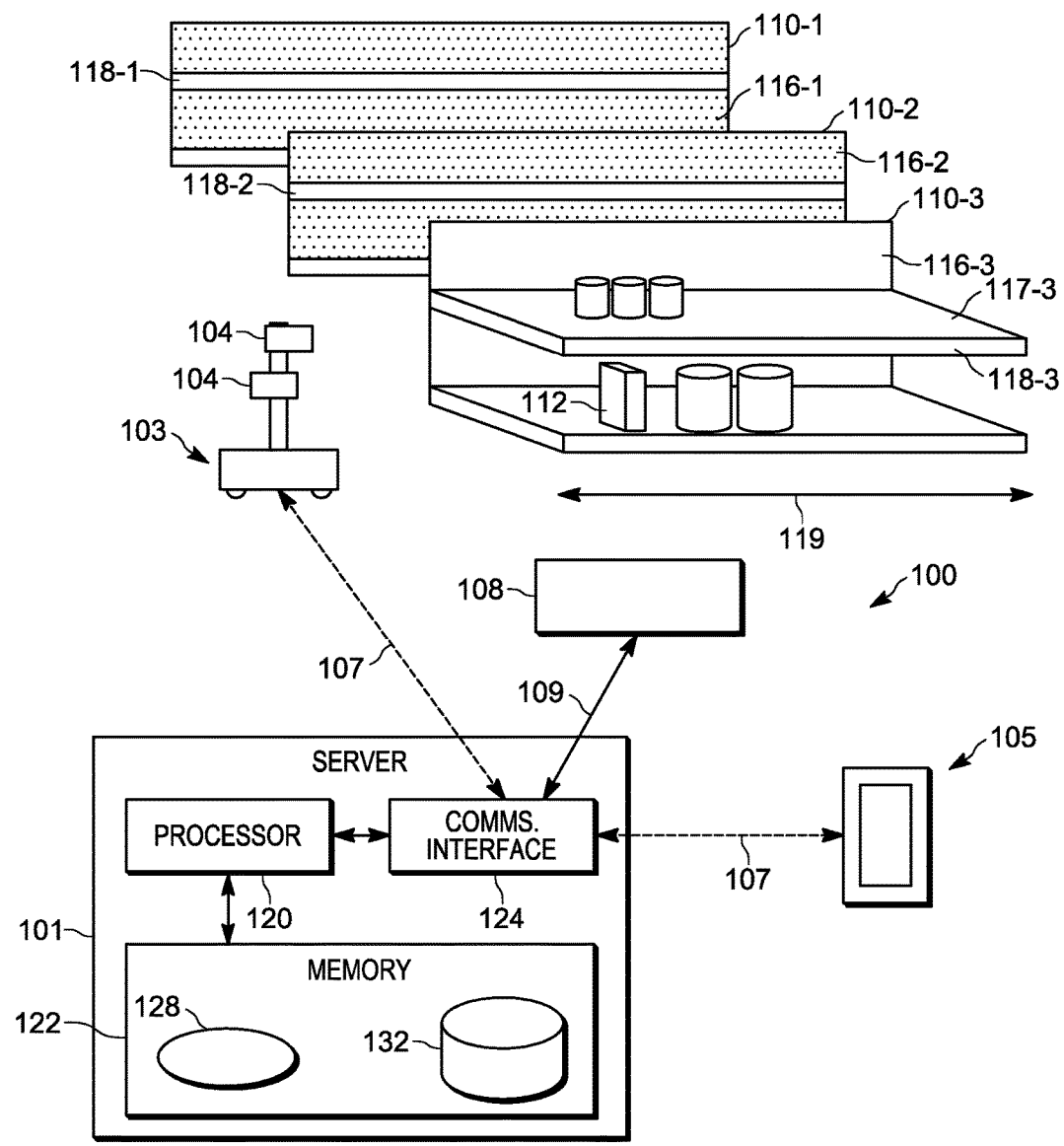
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a control method in a mobile automation system including a mobile automation apparatus and a control server. The method includes: storing, in a repository by the control server, (i) respective identifiers for a plurality of sub-regions in a facility, (ii) for each sub-region identifier, a location of the sub-region in the facility, and (iii) for each sub-region identifier, an operational constraint associated with the mobile automation apparatus; at the control server: obtaining a job definition indicating a set of the sub-region identifiers and a task to be performed; retrieving the locations and the operational constraints corresponding to the set of sub-region identifiers from the repository; allocating the set of sub-region identifiers to a plurality of subsets of sub-region identifiers, each subset having a shared common operational constraint; for each subset of sub-region identifiers, generating a task fragment containing the subset of sub-region identifiers, the common operational constraint, and the task; and sending the task fragments to the mobile automation apparatus for performance of the task at each of the set of sub-region identifiers.

Further examples disclosed herein are directed to a control server in a mobile automation system including a mobile automation apparatus, the control server comprising: a memory storing (i) respective identifiers for a plurality of sub-regions in a facility, (ii) for each sub-region identifier, a location of the sub-region in the facility, and (iii) for each sub-region identifier, an operational constraint associated with the mobile automation apparatus; a job preprocessor configured to obtain a job definition indicating a set of the sub-region identifiers and a task to be performed; a fragment generator configured to: retrieve the locations and the operational constraints corresponding to the set of sub-region identifiers from the repository; allocate the set of sub-region identifiers to a plurality of subsets of sub-region identifiers, each subset having a shared common operational constraint; for each subset of sub-region identifiers, generate a task fragment containing the subset of sub-region identifiers, and the common operational constraint; and a dispatcher configured to send the task fragments and an identifier of the task to the mobile automation apparatus for performance of the task at each of the set of sub-region identifiers.

Still further examples disclosed herein are directed to a mobile automation apparatus, comprising: a task manager configured to receive a task identifier and a plurality of task fragments from a control server, each task fragment containing (i) a subset of identifiers for respective sub-regions in a facility, and (ii) an operational constraint; a navigator configured, for each task fragment, to generate a path traversing the subset of sub-regions; the task manager further configured, during travel of the mobile automation apparatus along the path, to perform the identified task.

FIG. 1 depicts a mobile automation system 100 in accordance with the teachings of this disclosure. The system 100 includes a control server 101 (also referred to herein simply as the server 101), in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points. In other examples, the server 101, the client device 105, or both, are located outside the retail environment, and the links 107 therefore include wide-area networks such as the Internet, mobile networks, and the like. As will be described in greater detail below, the system 100 also includes a dock 108 for the apparatus 103. The dock 108 is in communication with the server 101 via a link 109 that in the present example is a wired link. In other examples, however, the link 109 is a wireless link. The mobile automation apparatus 103, when coupled to the dock 108, may establish communications with the dock 108 to communicate with the server 101 via the link 109 instead of, or in addition to, the link 107. The dock 108 may also supply power (e.g. electrical power) to the apparatus 103.

The client computing device 105 is illustrated in FIG. 1 as a mobile computing device, such as a tablet, smart phone or the like. In other examples, the client device 105 includes computing devices such as a desktop computer, a laptop computer, another server, a kiosk, a monitor, or other suitable device. The system 100 can include a plurality of client devices 105, each in communication with the server 101 via respective links 107.

The system 100 is deployed, in the illustrated example, in a retail environment including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3. The shelf modules 110 may also, in some examples, include other support structures, such as pegs, hangers and the like. The shelf modules 110 are typically arranged in a plurality of aisles, each of which includes a plurality of modules aligned end-to-end. In such arrangements, the shelf edges 118 face into the aisles, through which customers in the retail environment, as well as the apparatus 103, may travel. The aisles occupy regions of the retail environment, and the shelf modules 110 occupy sub-regions within the above-mentioned regions. The aisles and shelf modules 110 are therefore also referred to herein as regions and sub-regions, respectively. Other structures within the environment in which the system 100 is deployed may also occupy such regions and sub-regions instead of the aisles of shelf modules 110.

More specifically, the apparatus 103 is deployed within the retail environment, and communicates with the server 101 (e.g., via the link 107) to navigate, autonomously or partially autonomously, the length 119 of at least a portion of the shelves 110. The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light), and is further configured to employ the sensors to capture shelf data. In the present example, the apparatus 103 is configured to receive instructions from the server 101 to perform one or more tasks, such as a data capture task, respective to one or more shelf modules 110. The apparatus 103 is configured, responsive to such instructions, to navigate among the relevant shelf modules 110 and perform the specified task, for example by capturing images of the shelf modules 110 for delivery to the server 101.

The server 101 includes a special purpose controller, such as a processor 120, specifically designed to control the mobile automation apparatus 103 to perform tasks respective to the shelf modules 110 (such as the above-mentioned capture of images). To that end, the server 101 stores, in a memory 122, locations and operational constraints associated with the shelf modules 110. As will be discussed in greater detail below, the processor 120 is configured to provide instructions to the apparatus 103, via a communications interface 124, to perform tasks such as the above-mentioned data capture, and to receive the captured data or other results of the tasks for storage in a repository 132 in the memory 122. The server 101 is also, in some examples, configured to perform various post-processing activities on captured data, for example to determine product status data (e.g. out of stock or low stock products) and to transmit status notifications to the mobile device 105 responsive to the determination of product status data.

The processor 120 is interconnected with a non-transitory computer readable storage medium, such as the above-mentioned memory 122, having stored thereon computer readable instructions for executing control of the apparatus 103, as discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In an embodiment, the processor 120, further includes one or more central processing units (CPUs) and/or graphics processing units (GPUs). In an embodiment, a specially designed integrated circuit, such as a Field Programmable Gate Array (FPGA), is designed to perform the functionality discussed herein, either alternatively or in addition to the imaging controller/processor 120 and memory 122. As those of skill in the art will realize, the mobile automation apparatus 103 also includes one or more controllers or processors and/or FPGAs, in communication with the controller 120, specifically configured to control navigational and/or data capture aspects of the apparatus 103. The client device 105 also includes one or more controllers or processors and/or FPGAs, in communication with the controller 120, specifically configured to process (e.g. to display) notifications received from the server 101.

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the control application 128 or subcomponents thereof, the processor 120 is configured to implement various functionality. The processor 120, as configured via the execution of the control application 128, is also referred to herein as the controller 120. As will now be apparent, some or all of the functionality implemented by the controller 120 described below may also be performed by preconfigured hardware elements (e.g. one or more Application-Specific Integrated Circuits (ASICs)) rather than by execution of the control application 128 by the processor 120.

In the present example, in particular, the server 101 is configured via the execution of the control application 128 by the processor 120, to issue instructions to the apparatus 103 to cause the apparatus 103 to perform one or more specified tasks in the retail environment.

Figure 2A:
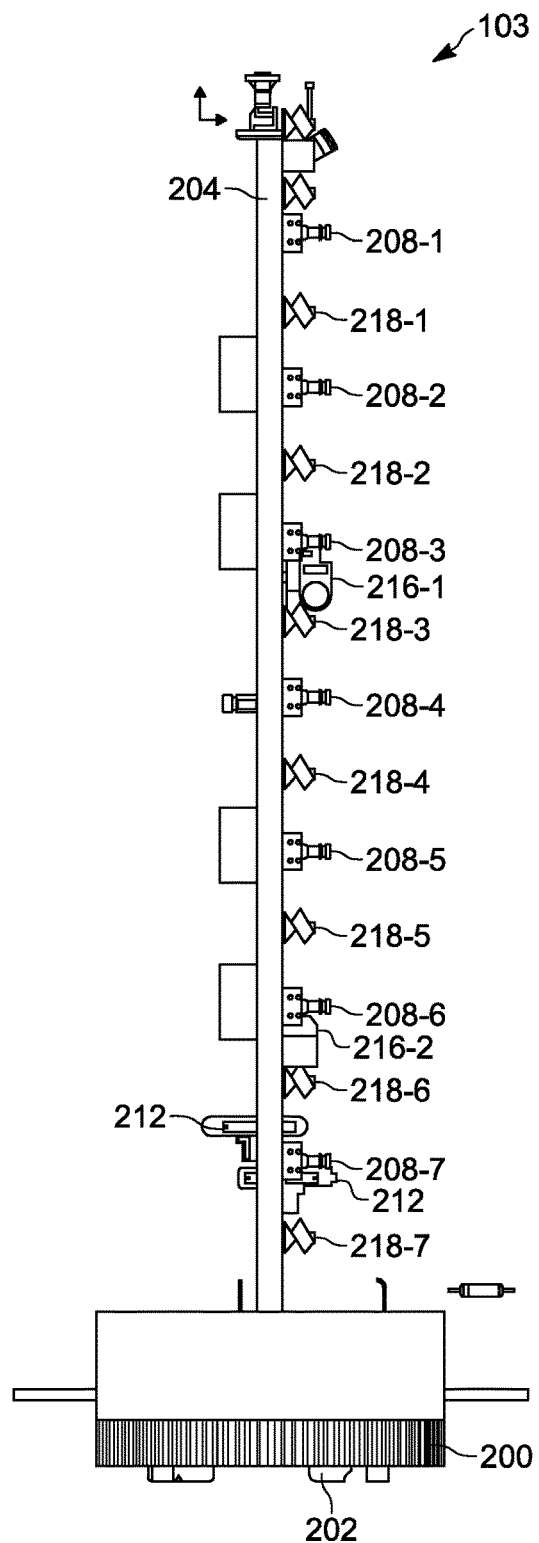
FIG. 2A depicts a mobile automation apparatus in the system of FIG. 1.
Figure 2B:
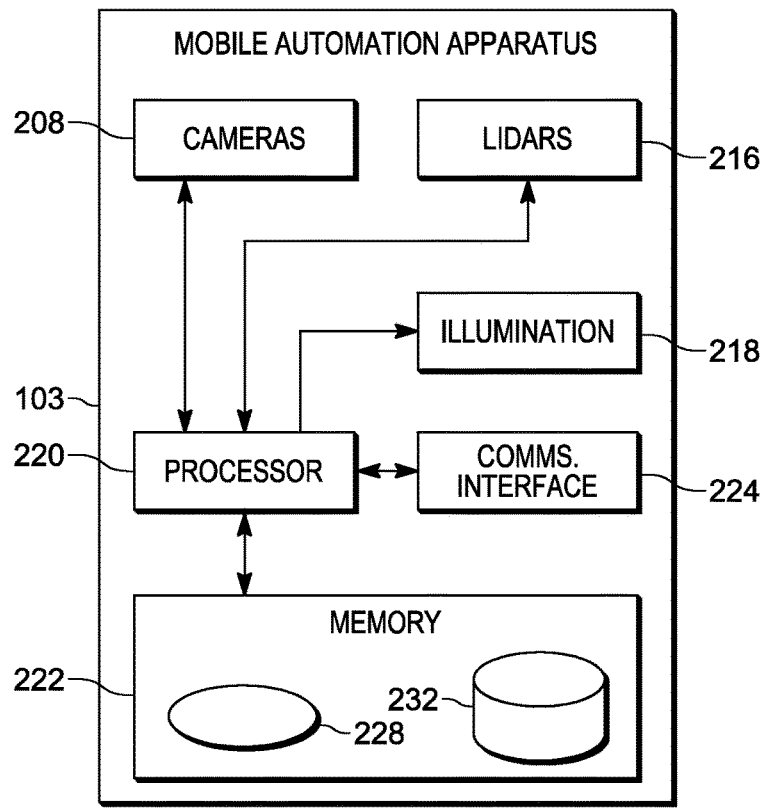
FIG. 2B is a block diagram of certain internal hardware components of the mobile automation apparatus in the system of FIG. 1.

Turning now to FIGS. 2A and 2B, before a discussion of the components and operation of the application 128, the apparatus 103 will be described in greater detail. The apparatus 103 includes a chassis 200 containing a locomotive mechanism 202 (e.g. one or more electric motors driving wheels, tracks or the like). In one embodiment, a special-purpose controller, such as a processor 220 (which may also be, in some examples, an ASIC and/or FPGA) configured to control navigational and/or data capture aspects of the apparatus 103 is also housed within the chassis 200. The controller 220 may control the locomotive mechanism 202 to move the apparatus 103, for example via the execution of computer-readable instructions such as a task execution application 228 stored in a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The application 228 may also be implemented as a suite of distinct applications, and such applications may be implemented as a combination of computer-readable instructions and/or preconfigured hardware elements such as ASICs and FPGAs. As will be described below, the execution of the application 228 by the controller 220 configures the apparatus 103 to receive instructions from the server 101 and, responsive to the instructions, perform tasks (such as the above-mentioned data capture) respective to shelf modules 110 identified in the instructions.

The memory 222 may also store a repository 232 containing, for example, a map of the environment in which the apparatus 103 operates, for use during the execution of the application 228. The apparatus 103 may communicate with the server 101, for example to receive the above-mentioned instructions, via a communications interface 224 over the link 107 shown in FIG. 1. The communications interface 224 also enables the apparatus 103 to communicate with the server 101 via the dock 108 and the link 109.

The apparatus 103 further includes a sensor mast 204 supported on the chassis 200 and, in the present example, extending upwards from the chassis 200. The mast 204 supports the sensors 104 mentioned earlier. In particular, the sensors 104 include at least one imaging sensor 208, such as a digital camera, as well as at least one depth-sensing sensor 212, such as a 3D digital camera. The apparatus 103 also includes additional depth sensors, such as LIDAR sensors 216, in the present example. The sensors 208, 212, 216 are oriented on the mast 204 such that the fields of view of each sensor face a shelf 110 along the length 119 of which the apparatus 103 is travelling. In other examples, the apparatus 103 includes additional sensors, such as one or more RFID readers, temperature sensors, and the like. In the present example, the mast 204 supports seven digital cameras 208-1 through 208-7, and two LIDAR sensors 216-1 and 216-2.

The mast 204 also supports a plurality of illumination assemblies 218, configured to illuminate the fields of view of the respective cameras 208. That is, the illumination assembly 218-1 illuminates the field of view of the camera 208-1, and so on. The sensors 208 and 216 are oriented on the mast 204 such that the fields of view of each sensor face a shelf 110 along the length 119 of which the apparatus 103 is travelling. As will be discussed in greater detail below, the apparatus 103 is configured to track a location of the apparatus 103 (e.g. a location of the center of the chassis 200) in a common frame of reference previously established in the retail facility.

Figure 3A:
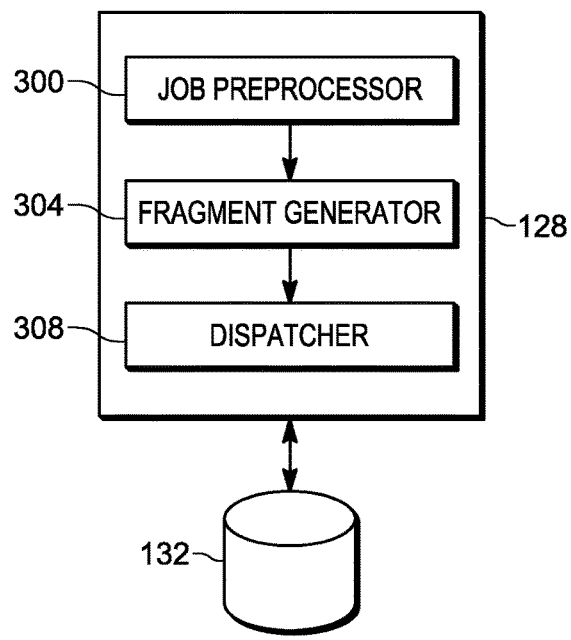
FIG. 3A is a block diagram of certain internal components of the server of the system of FIG. 1.
Figure 3B:
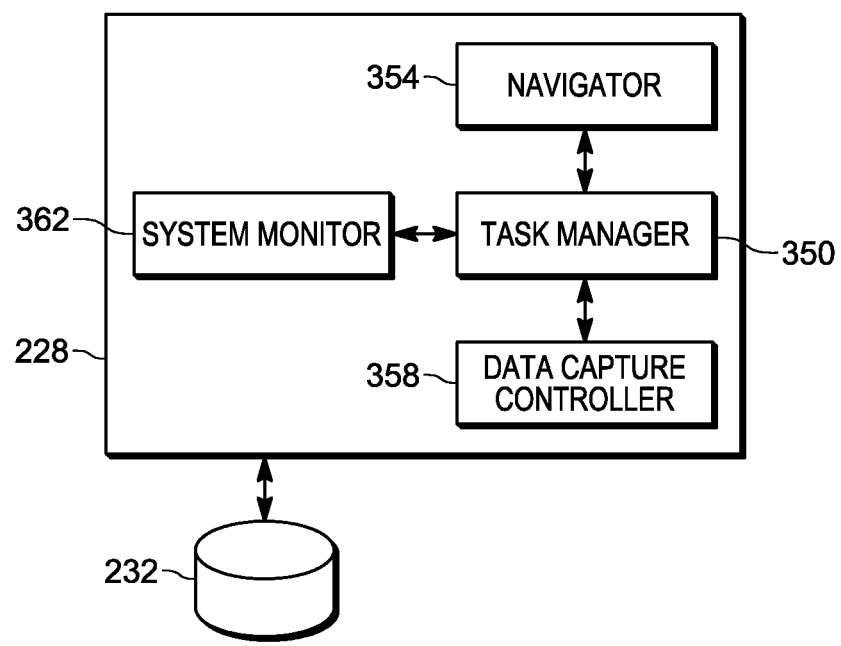
FIG. 3B is a block diagram of certain internal components of the mobile automation apparatus of the system of FIG. 1.

Turning now to FIGS. 3A and 3B, before describing the operation of the applications 128 and 228 to generate (e.g., at the server 101) and execute (e.g., at the apparatus 103) task instructions, certain components of the applications 128 and 228 will be described in greater detail. As will be apparent to those skilled in the art, in other examples the components of each of the applications 128 and 228 may be separated into distinct applications, or combined into other sets of components. Some or all of the components illustrated in FIGS. 3A and 3B may also be implemented as dedicated hardware components, such as one or more ASICs or FPGAs.

Referring to FIG. 3A, the control application 128 includes a job preprocessor 300 configured to obtain a job definition that specifies a task to be performed by the apparatus 103. The job preprocessor 300 may, for example, receive input data from a mobile device 105 and, based on the input data, identify an appropriate task to be performed by the apparatus 103 and a set of shelf modules 110 at which the apparatus 103 is to perform the above-mentioned task.

The control application 128 also includes a fragment generator 304, configured to generate a plurality of task fragments corresponding to the job definition. Further, the control application 128 includes a dispatcher 308 configured to deliver the task fragments to the apparatus 103, and to receive status data from the apparatus 103 relating to the performance of the task defined by the task fragments.

Turning to FIG. 3B, the control application 228 includes a task manager 350 configured to receive the above-mentioned task fragments from the server 101, and to control the other components of the application 228 in executing the task fragments. The other components include a navigator 354 configured to generate paths (for example, based on the map stored in the repository 232) through the retail environment traversing the shelf modules 110 identified by each fragment and to control the locomotive mechanism 202 to travel along the above-mentioned paths. The other components of the application 228 also include a data capture controller 358 configured to control the sensors 104 (e.g. the image sensors 208 and the depth sensors 212) to capture data such as images of the shelves 110 while the apparatus 103 travels along the paths generated by the navigator 354. The application 228 also includes a system monitor 362 configured to monitor the status of the apparatus 103. For example, the system monitor 362 can be configured to monitor a remaining energy capacity (e.g. fuel, battery level or the like) of the apparatus 103, a safety sensor (e.g. a safety lidar sensor configured to detect obstacles in the path of the apparatus 103), or the like. The system monitor 362 is configured to generate and provide alerts to the task manager 350 under certain conditions to interrupt the execution of the task fragments.

The functionality of the control application 128 and the control application 228 will now be described in greater detail, with reference to the components illustrated in FIGS.

Figure 4:
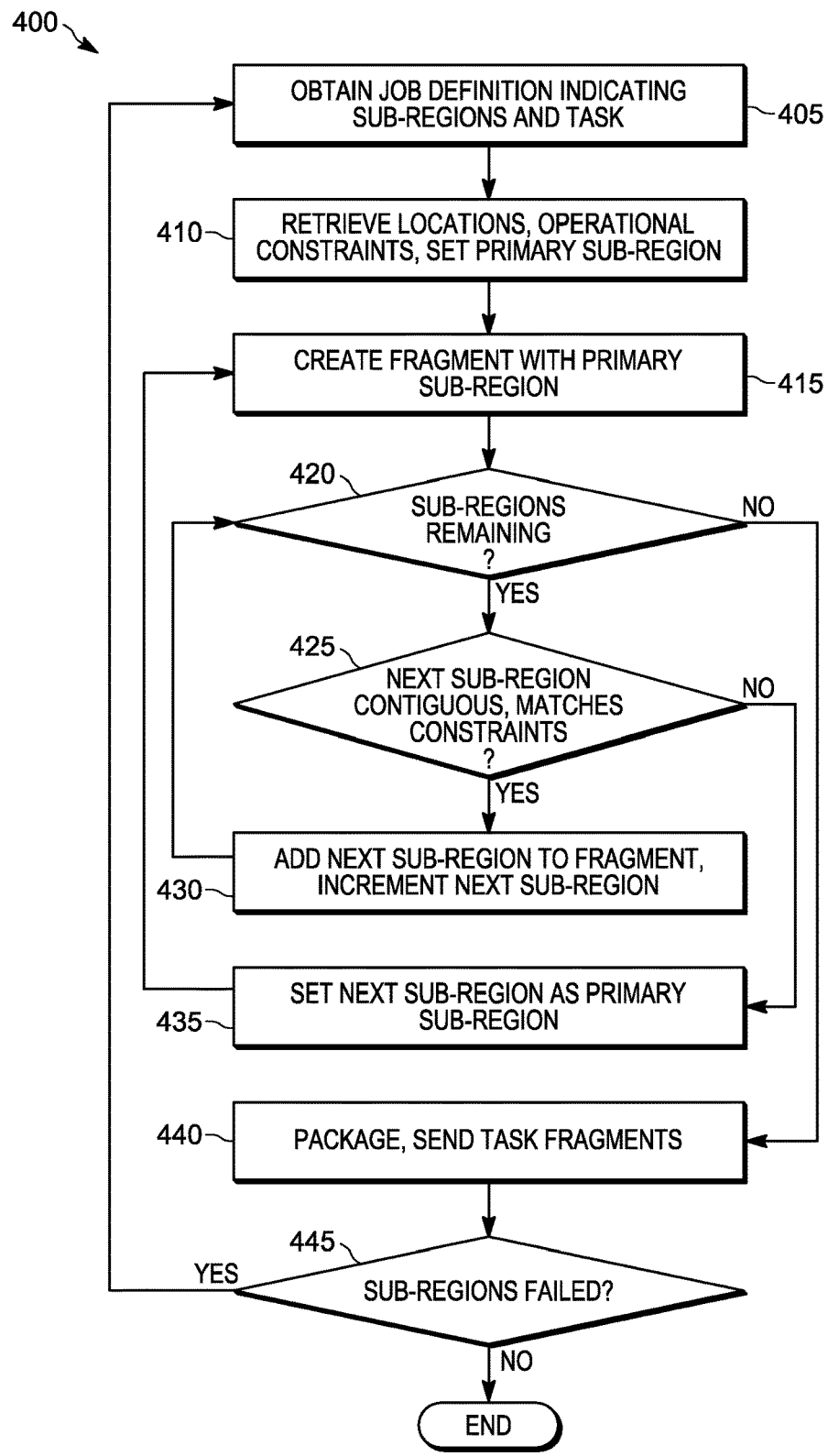
FIG. 4 is a flowchart of a control method at the server of the system of FIG. 1.

3A and 3B. Turning first to FIG. 4, a method 400 of generating and providing control data for the apparatus 103 is shown. The method 400 will be described in conjunction with its performance by the server 101 as described above.

At block 405, the server 101, and in particular the job preprocessor 300 of the application 128, is configured to obtain a job definition that indicates a set of sub-region identifiers (in the present example, a set of shelf module identifiers) and a task to be performed with respect to the set of sub-region identifiers. The job definition may be obtained in any of a variety of ways. For example, the job definition may be stored in the memory 122 in connection with a schedule, having been previously configured to execute at a particular time. The preprocessor 300 is configured, in such examples, to determine whether a current time matches a scheduled job definition and when the determination is affirmative, to retrieve the job definition from the memory 122. In other examples, the preprocessor 300 is configured to receive the job definition in the form of a request, such as a request received from the mobile device 105, via the link 107. The client device 105 may be configured to present on a display thereof a layout of the retail environment or another suitable graphical interface, and to receive a selection of one or more sub-regions of the retail environment (e.g. a selection of shelf modules 110), and of a task to be performed with respect to the selected sub-regions. The client device 105 is configured, responsive to such a selection, to transmit a request to the server 101 via the link 107. As will be discussed in greater detail below, the preprocessor 300 can also be configured to obtain a job definition by automatically generating the job definition internally, responsive to status data received from the apparatus 103 corresponding to a previous task.

The job definition, as noted above, indicates a set of sub-region identifiers, as well as an indication of a task to be performed by the apparatus 103 in association with the set of sub-region identifiers. The preprocessor 300 is configured, in some examples, to receive sub-region identifiers and a task identifier at block 405 (e.g. from the mobile device 105). In other examples, however, the preprocessor 300 receives information that indirectly identifies the sub-regions and the task. For example, the preprocessor 300 can be configured to receive a selection of a region (e.g. an aisle) from the mobile device 105, and to determine which sub-regions correspond to the selected region. Further, the preprocessor 300 can be configured to receive a selection of a post-processing task from the mobile device 105, and to determine which task corresponds to the selected post-processing task.

The above determinations are made by the preprocessor 300 based on data stored in the memory 122 (e.g., in the repository 132) including respective identifiers for each of a plurality of regions in the environment, and for each region, a plurality of identifiers of sub-region within the region. The repository 132 also contains identifiers of a plurality of post-processing tasks and, for each post-processing task, a corresponding task to be performed by the apparatus 103. Table 1, below, illustrates region and sub-region identifiers. Specifically, regions (aisles, in the present example) are identified along with the sub-regions (shelf modules 110, in the present example) contained within each aisle.

TABLE 1

Region and Sub-Region Identifiers

| Department | Aisle(s) | Module(s) |
|---|---|---|
| Grocery | 1 | 1-A-1-G |
|  | 2 | 2-A-2-F |
| ... | ... | ... |

Further, Table 1 includes an additional level of identifiers corresponding to supersets of the above-mentioned regions. In particular, one or more department identifiers may be stored in the repository, along with the identifiers of regions (e.g., aisles) contained within each department. The job obtained at block 405 may therefore also originate with a request identifying one or more departments rather than one or more aisles, or one or more shelf modules 110.

Table 2 illustrates an example set of post-processing tasks, which include the post-processing activities mentioned earlier that may be performed by the server 101 on captured data (e.g. images of shelf modules 110). Each post-processing task corresponds to a task to be performed by the apparatus 103. In the examples shown below, the tasks, when performed by the apparatus 103, provide input data to the server 101 for use in completing the corresponding post-processing task.

TABLE 2

Post-Processing Task and Task Identifiers

| Post-processing task | Task |
|---|---|
| Out-of-stock detection | Data capture |
| Plug detection | Data capture |
| ... | ... |

For the present example performance of the method 400, it is assumed that at block 405 the preprocessor 300 receives a request (e.g., from the mobile device 105) to perform out-of-stock detection for the grocery department. The preprocessor 300 is therefore configured, based on the data show above in Tables 1 and 2, to generate a job definition identifying the shelf modules 110 contained in the grocery department (i.e. the modules 110 of the aisles identified "1" and "2"; that is, the modules 1-A to 1-G and 2-A to 2-F), and also identifying the task "data capture". The preprocessor 300 is then configured to pass the job definition to the fragment generator 304.

At block 410, the fragment generator 304 is configured to retrieve locations within a common frame of reference (i.e., a coordinate system referencing the retail environment) for each of the sub-regions indicated by the job definition. The fragment generator 304 is also configured to retrieve at least one operational constraint corresponding to each of the set of sub-regions indicated by the job definition. The above data is retrieved from the memory 122 (e.g., from the repository 132 or from configuration data associated with the application 128). Table 3, below, illustrates an example set of data stored in the memory 122 and indicating, for each shelf module 110, a location with the common frame reference and a set of operational constraints.

TABLE 3

Sub-Region Locations and Operational Constraints

| Module | Location | Illumination | Speed (m/s) | Distance (m) |
|---|---|---|---|---|
| 1-A | $x_1, y_1, z_1$ | High | 0.25 | 0.5 |
| 1-B | $x_2, y_2, z_2$ | High | 0.25 | 0.5 |
| 1-C | $x_3, y_3, z_3$ | Low | 0.30 | 0.5 |
| 1-D | $x_4, y_4, z_4$ | Low | 0.30 | 0.5 |
| 1-E | $x_5, y_5, z_5$ | Low | 0.30 | 0.5 |
| 1-F | $x_6, y_6, z_6$ | Low | 0.30 | 0.6 |
| 1-G | $x_7, y_7, z_7$ | Low | 0.30 | 0.6 |
| 2-A | $X_8, y_8, z_8$ | Low | 0.30 | 0.6 |
| 2-B | $x_9, y_9, z_9$ | Low | 0.30 | 0.6 |
| 2-C | $x_{10}, y_{10}, z_{10}$ | Low | 0.30 | 0.6 |
| 2-D | $x_{11}, y_{11}, z_{11}$ | High | 0.25 | 0.5 |
| 2-E | $x_{12}, y_{12}, z_{12}$ | High | 0.25 | 0.5 |
| 2-F | $x_{13}, y_{12}, z_{13}$ | High | 0.25 | 0.5 |
| ... | ... | ... | ... | ... |

The operational constraints, in the present example, include at least one navigational constraint and at least one data capture constraint. In particular, Table 3 includes two navigational constraints corresponding to each shelf module 110: a maximum speed imposed on the apparatus 103 as the apparatus 103 travels along the module 110, and a target distance from the module 110 to be maintained by the apparatus 103 as the apparatus 103 travels along the module 110. The operational constraints specified by Table 3 also include one data capture constraint, in the form of an illumination setting to be applied by the apparatus 103 during image capture. The values corresponding to each operational constraint as shown above are provided solely for illustrative purposes; a variety of other values may also be specified, and the operational constraints need not be specified in the formats shown above. For example, illumination constraints may be expressed in lumens or another suitable measurement of light output. Other operational constraints may also be stored in association with each module 110, such as an image capture frame rate, a minimum travel speed, and the like.

At block 410, the fragment generator 304 is also configured to set a primary sub-region identifier. In the present example, the primary sub-region is the first sub-region indicated in the job definition (i.e., the module identifier 1-A). At block 415, the fragment generator 304 is configured to create a task fragment with the primary sub-region. To that end, the fragment generator 304 is configured to set operational constraint values for the task fragment that match the operational constraints of the primary sub-region. Beginning with the sub-region 1-A, therefore, the fragment generator 304 is configured to create a task fragment with the operational constraints shown in the first row of Table 3.

At block 420, the fragment generator 304 is configured to determine whether any sub-regions remain to be processed. When the determination is affirmative, at block 425 the fragment generator 304 is configured to compare the operational constraints of the next sub-region (i.e., the module 1-B in the present example performance), as well as the location of the next sub-region, to those of the primary sub-region. More specifically, at block 425 the fragment generator 304 is configured to determine whether the next sub-region is both contiguous with the primary sub-region in the common frame of reference, and has the same operational constraints as the primary sub-region. The determination of whether the next sub-region is contiguous with the primary sub-region is based on the sub-region locations stored in the memory 122. For example, the locations of Table 3 may correspond to the center of each module 110, and the fragment generator 304 may therefore be configured, based on known dimensions of the modules 110, to determine whether the distance between module centers indicates that the modules are contiguous (i.e., disposed end-to-end, with minimal or no space between the modules 110).

The determination at block 425 is negative if any of the operational constraints of the next sub-region are different from any of the operational constraints of the primary sub-region. The determination at block 425 is also negative when the modules are not contiguous. When the determination at block 425 is affirmative, however, the fragment generator 304 is configured to add the identifier of the next sub-region to the task fragment at block 430, and to return to block 420. When the determination at block 425 is negative, the fragment generator 304 proceeds instead to block 435, at which the next sub-region is set as the current primary sub-region, and returns to block 415. In other words, when the next sub-region does not satisfy both the conditions imposed by the determination at block 425, it is placed in a new task fragment, and the fragment generator 304 evaluates subsequent sub-regions for membership in the new task fragment. As will now be apparent to those skilled in the art, other processes may also be implemented by the server 101 for allocating sub-regions to task fragments. In general, the fragment generator 304 groups contiguous sub-regions having common operational constraints into distinct task fragments.

When the determination at block 420 is negative, indicating that all sub-regions identified in the job definition have been processed, the fragment generator 304 passes the task fragments, each of which includes a subset of the sub-region identifiers from the job definition as well as a set of operational constraints for the task fragment, to the dispatcher 308. The dispatcher 308, in turn, is configured to package the task fragments and transmit the task fragments to the apparatus 103, for example via the link 107. Table 4 below illustrates an example package of task fragments generated via the performance of blocks 415-435 and packaged for transmission by the dispatcher 308.

TABLE 4

Task Fragment Package

| Task | Fragment | Modules | Illumination | Speed (m/s) | Distance (m) |
|---|---|---|---|---|---|
| Data Capture | F-1 | 1-A, 1-B | High | 0.25 | 0.5 |
| | F-2 | 1-C, 1-D, 1-E | Low | 0.30 | 0.5 |
| | F-3 | 1-F, 1-G | Low | 0.30 | 0.6 |
| | F-4 | 2-A, 2-B, 2-C | Low | 0.30 | 0.6 |
| | F-5 | 2-D, 2-E, 2-F | High | 0.25 | 0.5 |

As seen in Table 4, the modules 110 referred to in the example job definition mentioned earlier have been grouped into task fragments based on contiguity and shared operational constraints. The package illustrated by Table 4 also includes a task identifier ("data capture" in the present example) corresponding to the task fragments. As will now be apparent, the task fragments, taken together, represent the complete set of sub-regions indicated by the job definition.

Following the transmission of the task fragments to the apparatus 103, the dispatcher 308 is configured to receive status data concerning the performance of the task specified by the fragments, and to assess the status of the task at block 445. The performance of block 445, however, will be described in further detail below, following a discussion of task execution at the apparatus 103.

Figure 5:
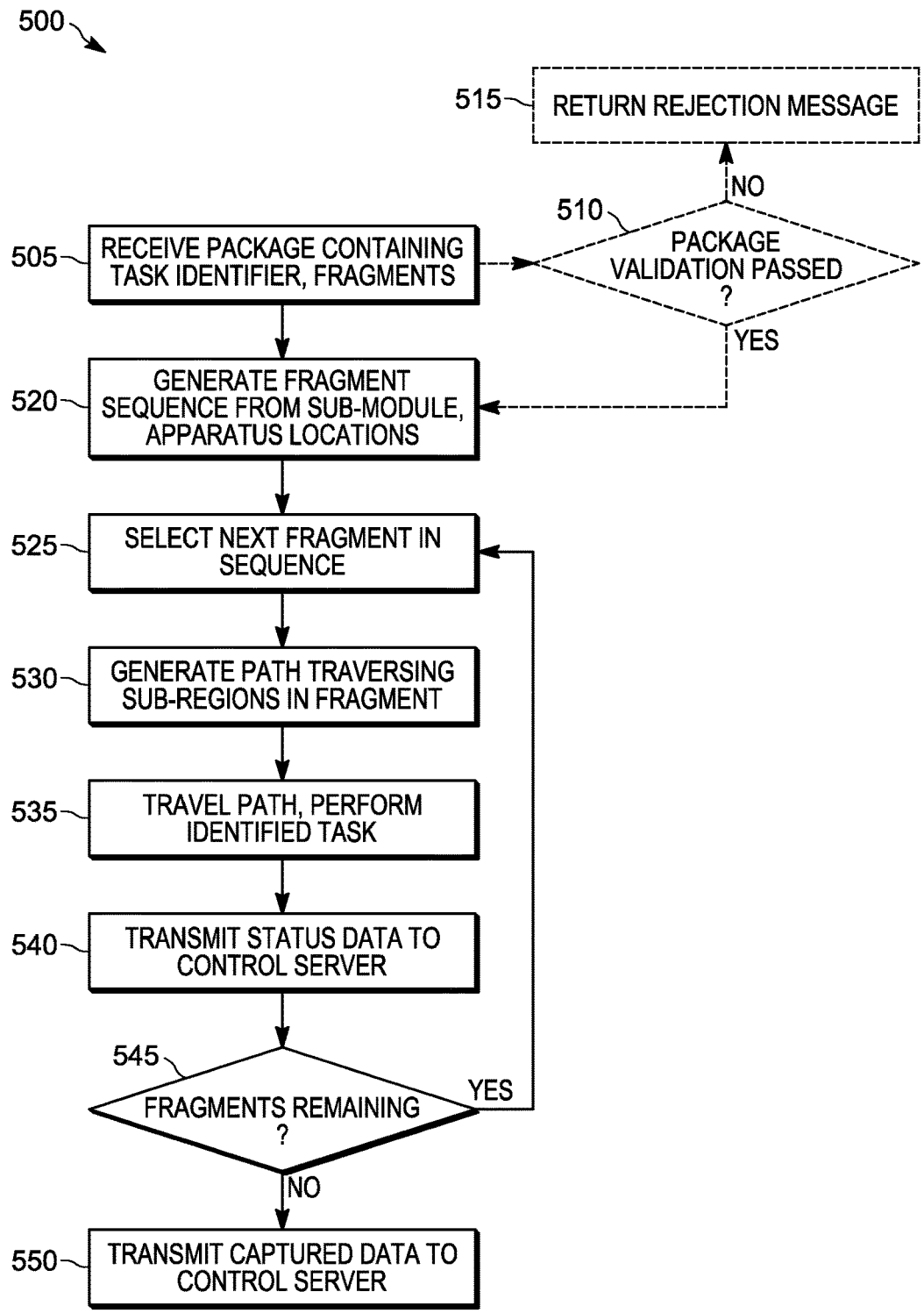
FIG. 5 is a flowchart of a control method at the mobile automation apparatus of the system of FIG. 1.

Turning to FIG. 5, a method 500 of executing a task is depicted, which will be discussed below in connection with its performance by the apparatus 103. At block 505, the apparatus 103, and in particular the task manager 350, is configured to receive (via the communications interface 224) a plurality of task fragments and a task identifier. The plurality of task fragments received in the present example performance of the method 500 is the task fragment package discussed above and shown in Table 4. Thus, the task fragments received at block 505 each include a set of sub-region identifiers, and at least one operational constraint—the task fragments received in the present performance of block 505 include three operational constraints, as discussed above. As will be discussed in further detail below, each task fragment also includes a task fragment identifier, which may also be referred to as a fragment index. The task fragment identifiers may take a variety of forms, including the identifiers "F-1", "F-2" and so on shown in Table 4.

At block 505, the task manager 350 is configured, in the present example, to provide the task fragments to the navigator 354 and the data capture controller 358. The components of the controller 228 to which the task manager 350 passes the task fragments may be based on the task identifier. For example, the task manager 350 can store a mapping between task identifiers and sets of controller components. Some task identifiers, for example, may not require data capture functionality, and may therefore be passed only to the navigator 354.

The navigator 354 and the data capture controller 358 are configured, following receipt of the task fragments, to extract and store locally the fragment identifiers and at least a predefined portion of each task fragment. The navigator 354, for example, is configured to extract the fragment identifiers and the navigational constraints (e.g., speed and distance from shelf modules 110). The data capture controller 358 is configured to extract the fragment identifiers and the data capture constraints.

At block 510, any one of, or any combination of, the task manager 350, the navigator 354 and the data capture controller 358 can be configured to determine whether the task fragments received at block 505 satisfy one or more validation criteria. The validation criteria, in general, indicate conditions enabling the apparatus 103 to carry out the task defined by the task fragments. For example, the navigator 354 may be configured to determine whether the task fragments impose navigation-related operational constraints that the apparatus 103 cannot satisfy, such as a total travel distance that exceeds an operational range of the apparatus 103. The task manager 350 may be configured, for example, to determine whether the data received at block 505 is malformed (e.g., contains protocol errors). When the determination at block 510 is negative, at block 515 the task manager is configured to return a message rejecting the task fragments to the server 101, and the performance of the method 500 ends. In other examples, the performance of blocks 510 and 515 are omitted, and the controller 228 proceeds directly from block 505 to block 520.

At block 520, the controller 128 is configured to generate a sequence for the task fragments. In particular, the navigator 354 is configured to retrieve the locations of the sub-regions identified in the fragments from the map stored in the repository 232 as mentioned earlier. The navigator 354 is also configured to retrieve a current location of the apparatus 103 itself in the common frame of reference. Based on the sub-region locations (e.g., the locations of the end-points of each task fragment) and the current location of the apparatus, the navigator 354 is configured to generate the sequence to optimize the distance that the apparatus 103 must travel to complete the task fragments.

Figure 6:
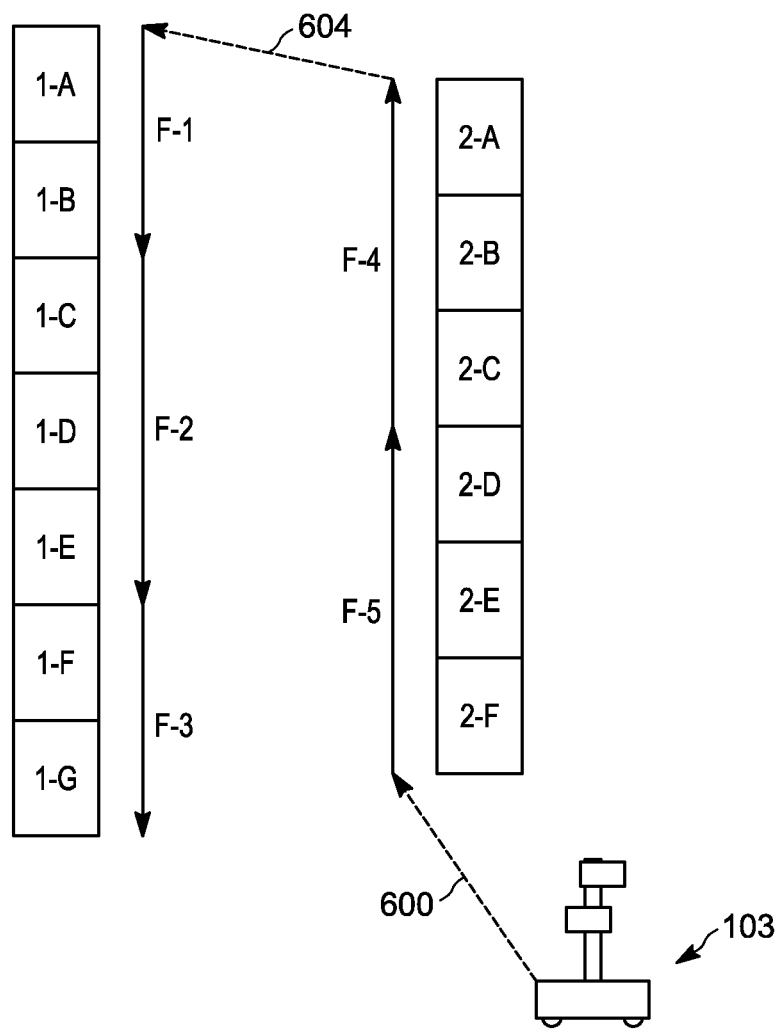
FIGS. 6-7 depict the performance of the method of FIG. 5 by the mobile automation apparatus of FIG. 1.

Turning to FIG. 6, an overhead view of the modules 110 identified in the task fragments of Table 4 is shown (in which it is also evident that the modules 110 of the first aisle are contiguous, and that the modules 110 of the second aisle are also contiguous with each other, but not with the modules 110 of the first aisle). The current location (at the time of receipt of the task fragments from the server 101) of the apparatus 103 is also shown in FIG. 6. As will be apparent to those skilled in the art from FIG. 6, executing the task fragments in the order shown in Table 4 would require the apparatus to travel to the module 1-A before beginning the data capture task, and would also require the apparatus 103 to travel from the module 1-G to the module 2-A in between the performance of the fragments F-3 and F-4. The navigator 354 is configured to sequence the task fragments to reduce the total distance travelled in the execution of the task fragments, according to a suitable path optimization process. In the present example, as shown in FIG. 6, the navigator 354 generates a sequence beginning with the task fragment F-5, followed by the fragments F-4, F-1, F-2 and F-3. The navigator 354 may also be configured to sequence the sub-regions identified by each task fragment. For example, the sub-regions of the fragments F-4 and F-5 as shown in FIG. 6 will be travelled in the reverse order than that shown in Table 4. In other examples, the sequencing of sub-regions may be performed at a later stage of the method 500.

In some examples, the sequencing of the sub-regions within task fragments is dictated by the order in which the sub-regions are presented in the task fragments as received from the server 101. In such examples, the navigator 354 is configured to omit the sequencing of sub-regions as discussed above.

The navigator 354 is configured, when the sequence has been generated at block 520, to return the sequence to the task manager 350. The task manager 350 is then configured to initiate the execution of the task fragments at block 525. Specifically, at block 525, the task manager 350 is configured to select the next task fragment in the sequence received from the navigator 354. In other examples, the navigator 354 may store the sequence locally, without providing the sequence to the task manager 350. In such examples, the task manager 350 is configured to request the next task fragment in the sequence from the navigator 354. The next task fragment is the task fragment closest to the start of the sequence that has not yet been completed. In the present example, performance of the method 500, no task fragments have been completed, and therefore at block 525 the task manager 350 selects the task fragment F-5.

At block 530, the controller 128 is configured to generate a path for the task fragment selected at block 525. In particular, having selected the next task fragment, the task manager is configured to transmit the identifier of the selected task fragment to the navigator 354 for path generation. The navigator 354 is configured to generate a path for the task fragment based on the previously extracted sub-region identifiers and navigational constraints corresponding to the task fragment identifier received from the task manager 350. The generation of a path at block 530 can include generating a path to a starting location for the task fragment, in addition to generating a path traversing the sub-regions of the task fragment itself. For example, referring to FIG. 6, the navigator 354 can be configured to generate a first path corresponding to the dashed line 600 from the current location to the start of the fragment F-5, as well as a path corresponding to the fragment F-5 itself. A similar process is performed for the fragment F-1, in which the navigator 354 generates a path illustrated by the dashed line 604, as well as path for the fragment F-1 itself.

The navigator 354 can also be configured to repeat the above steps for each task fragment, including those at which the endpoint of a completed task fragment coincides with the start of the next task fragment. That is, the task manager 350 can be configured to instruct the navigator to travel to the start of the next task fragment, leading to path generation from the current location of the apparatus 103 to the start of the next task fragment. The task manager 350 can then, upon receiving confirmation from the navigator 354 that the apparatus 103 has arrived at the start of the next task fragment, instruct the navigator to generate a path for the task fragment itself. In some instances (e.g., at the initiation of the fragment F-4) the path to the start of the next task fragment may not require any travel, in which case the navigator 354 may be configured to immediately send confirmation that the start of the next task fragment has been reached.

Returning to FIG. 5, at block 535, the task manager 350 is configured to initiate the execution of the next task fragment selected at block 525 by sending instructions to the navigator 354 and the data capture controller 358 to travel along the path generated at block 530 and to begin capturing data, respectively. More specifically, the task manager 350 is configured to transmit an instruction to begin navigation for the next task fragment to the navigator 354, and to transmit an instruction to begin data capture for the next task fragment to the data capture controller 358. In the present example, the task manager 350 is configured to transmit the instruction to the data capture controller 358 prior to transmitting the instruction to the navigator 354, to ensure that data capture has begun when the apparatus 103 begins traversing the sub-regions of the current task fragment. In some examples, the generation of a path (described above in connection with block 530) can be performed by the navigator 354 at block 535, responsive to receiving the instruction from the task manager 350 to begin navigation.

The navigator 354 is configured, during the performance of block 535, to control the locomotive mechanism 202 and associated components of the apparatus 103, to travel along the path generated at block 530 (or, as noted above, at block 535) for the current task fragment. The navigator 354 achieves such control via one or more navigation sensors (e.g., lidar sensors), the map stored in the repository 232 and the current location of the apparatus 103, which is periodically updated. During the traverse of the sub-regions corresponding to the current task fragment, the data capture controller 258 is configured to control any one or more of the image and depth sensors 208, 212, and 216 to capture imaging data (which will depict the sub-regions the apparatus 103 is traversing) and store the imaging data in the repository 232.

As the apparatus 103 travels along the sub-regions corresponding to the current task fragment, the navigator 354 is configured to monitor the current location of the apparatus 103, and to notify the task manager 350 of each sub-regions that has been successfully traversed. Thus, the task manager 350 can store a list of traversed sub-regions, indicating that the data capture task has been completed for any sub-regions identified in the list. When the navigator 354 detects that the apparatus 103 has arrived at the endpoint of the path corresponding to the current task fragment, the navigator 354 is configured notify the task manager 350 that travel along the path is complete. In response, the task manager 350 is configured to transmit an instruction to the data capture controller to cease capturing image data, and to proceed to block 540.

During the performance of block 535, one or both of the navigator 354 and the task manager 350 may detect interruptions to the execution of the task fragment. For example, the task manager 350 may receive an instruction from the server 101 (e.g., from the dispatcher 308) to pause or abort the task package received at block 505. As a further example, the task manager 350 may receive an alert from the system monitor 362, such as a low battery warning indicating that the power supply of the apparatus 103 requires imminent recharging. Responsive to such an alert, the task manager 350 is configured interrupt the performance of block 535 by sending instructions to the navigator 354 and the data capture controller 362 to cease travel along the path corresponding to the current task fragment and capture of image data, respectively. The task manager 350 is then configured to issue an instruction to the navigator 354 selected (e.g. from a mapping stored in the memory 222) based on the nature of the alert. For example, the task manager 350 can be configured to respond to a low battery warning by instructing the navigator 354 to proceed to the dock 108. Other examples of alerts that may lead to an interruption of a task fragment include an emergency stop alert generated by the system monitor 362 (which may cause the task manager 350 to cease navigation and data capture until further instruction is received from the server 101 or an operator), a time-out alert generated internally by the task manager 350 responsive to a task fragment exceeding a maximum allowable completion time period. In response to a time-out, the task manager 350 may proceed directly to block 540 (discussed below), irrespective of whether the current task fragment is complete.

Figure 7:
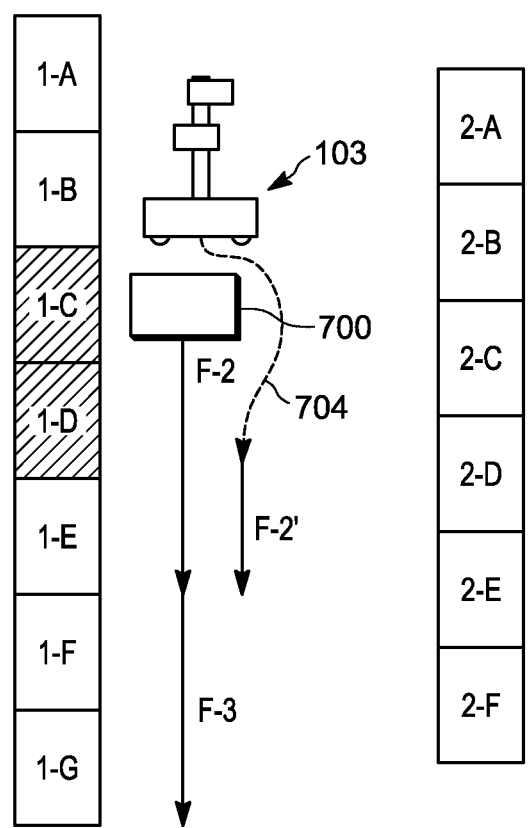

A further example of an interruption to the execution of a task fragment is shown in FIG. 7, in which an obstacle 700 is detected by the navigator 354 in the path previously generated along the modules 110 of the task fragment F-2. Responsive to detecting the obstacle 700, the navigator 354 is configured to notify the task manager 350 of the obstacle detection, and the task manager 350 is configured to interrupt execution of the current task fragment (the fragment F-2, in the example shown in FIG. 7). The task manager 350 is then configured to select a further instruction to transmit to the navigator 354. For example, the task manager 350 can be configured to instruct the navigator 354 to generate an alternative path (shown at 704) to bypass the obstacle 700 and return to the path previously generated for the task fragment F-2. In other examples, the task manager 350 can be configured to instruct the navigator 354 to simply pause for a predefined time period and then resume travel along the path generated at block 530, during which time the obstacle 700 may have moved from the path to be travelled by the apparatus 103.

When any of the above interruptions are cleared (e.g., when the battery is recharged at the dock 108, or when navigation along the alternative path 704 mentioned above is complete), the task manager 350 is configured to resume execution of the task fragment. For example, the task manager 350 can be configured to instruct the navigator 354 to travel to the sub-region in the task fragment that follows the last sub-region traversed before the interruption. Upon arrival at the relevant sub-region, the task manager 350 can be configured to instruct the data capture controller 258 to begin data capture, and to instruct the navigator 254 to travel along the remaining sub-regions of the task fragment. In some scenarios, such as the obstacle-avoidance scenario shown in FIG. 7, the task manager 350 is instead configured to instruct the navigator to travel along the path generated at block 530 beginning not that the point of interruption, but at the closest sub-region to the apparatus 103 following successful navigation around the obstacle 700. Thus, as shown in FIG. 7, when the apparatus 103 continues to travel along the remainder of the fragment F-2 (as shown at F-2'), the modules 1-C and 1-D will be skipped (i.e. no data will be captured for the modules 1-C and 1-D).

In further examples, rather than controlling the apparatus 103 to resume an interrupted task fragment, the task manager 350 can be configured to proceed directly to the next task fragment, skipping any portion of the current task fragment that was not executed prior to the interruption. In other words, in such embodiments the task manager 350 proceeds directly to block 540 following an interruption, rather than resuming the performance of block 535.

At block 504, responsive to completion of the task fragment, or to interruption of the task fragment, the task manager 350 is configured to transmit status data to the server 101 (e.g., to the dispatcher 308). The status data indicates whether the task was successfully performed for each of the set of sub-region identifiers corresponding to the task fragment. For example, the status data can include the fragment identifier (e.g., F-2), and a status indicator corresponding to each sub-region in the task fragment. Thus, in the example of FIG. 7, the status data includes the identifier F-2, and an indication that the data capture task was successfully performed for the module 1-E, but not for the modules 1-C and 1-D. The status data is transmitted over the link 107. In some examples, status data may be communicated from the task manager 350 to the dispatcher 308 during the performance of block 535 (i.e., on a sub-region by sub-region basis) rather than following the completion of a task fragment. In further embodiments, the transmission of status data may be delayed until the performance of block 550, described below.

At block 545, the task manager 350 is configured to determine whether any task fragments from the package received at block 505 remain to be executed. When the determination is affirmative, the performance of the method 500 returns to block 525. When the determination is negative, however, indicating that every task fragment has been executed (even if some task fragments or portions thereof were interrupted), the task manager 350 proceeds to block 550.

At block 550 the task manager 350 is configured to transmit the captured data to the server 101. In particular, the task manager 350 is configured to send an instruction to the navigator 354 to travel to the dock 108. Responsive to arriving at the dock 108, the task manager 350 is configured to upload the captured data to the server 101 via the link 109. In other examples, the data can be transmitted wirelessly via the link 107, either following completion of the task fragment package or during the execution of each task fragment. The task manager 350 may then await receipt of a further package at block 505.

Returning to FIG. 4, as noted earlier, the control application 128 is configured to assess status data associated with the task fragments at block 445. More specifically, the control application 128 is configured, responsive to receiving the status data transmitted by the apparatus 103 at block 540, to determine whether the status data indicates that any of the sub-regions corresponding to the package of task fragments sent at block 440 failed (i.e. whether the task was not performed for any of the sub-regions).

When the determination at block 445 is negative, the performance of the method 400 ends. When the determination at block 445 is affirmative, however, the control application 128 is configured to return to block 405 and generate a job definition from the failed sub-regions as indicated by the status data.

Variations to the methods and systems discussed above are contemplated. For example, the methods 400 and 500 can be deployed to perform tasks other than the above-mentioned data capture task. In some examples the apparatus 103 can be configured to perform a guidance task, e.g. to guide a patron in the retail environment to a particular location.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A control method in a mobile automation system including a mobile automation apparatus and a control server, comprising:
    storing, in a repository by the control server, (i) respective identifiers for a plurality of sub-regions in a facility, (ii) for each sub-region identifier, a location of the sub-region in the facility, and (iii) for each sub-region identifier, an operational constraint associated with the mobile automation apparatus;
    at the control server:
        obtaining a job definition indicating a set of the sub-region identifiers and a task to be performed;
        retrieving the locations and the operational constraints corresponding to the set of sub-region identifiers from the repository;
        allocating the set of sub-region identifiers to a plurality of subsets of sub-region identifiers, each subset having a shared common operational constraint;
        for each subset of sub-region identifiers, generating a task fragment containing the subset of sub-region identifiers, and the common operational constraint;
        sending the task fragments and an identifier of the task to the mobile automation apparatus for performance of the task at each of the set of sub-region identifiers;
        responsive to sending the task fragments, receiving status data from the mobile automation apparatus indicating whether the task was successfully performed for each of the set of sub-region identifiers, and repeating the allocating, the generating, and the sending for any sub-region identifiers for which the task was not successfully performed.

2. The control method of claim 1, further comprising: storing, in the repository:
    (i) respective identifiers for a plurality of regions in the facility;
    (ii) for each region identifier, a plurality of the sub-region identifiers;
    (iii) a plurality of post-processing tasks and, for each post-processing task, a corresponding task to be performed by the mobile automation apparatus wherein the obtaining comprises:
    receiving the job definition containing a region identifier and a post-processing task;
    retrieving the set of sub-region identifiers corresponding to the region identifier; and
    retrieving the task corresponding to the post-processing task.

3. The method of claim 1, wherein the facility is a retail facility, and wherein the sub-regions are shelf modules in the retail facility.

4. The method of claim 1, wherein the task comprises a data capture task.

5. The method of claim 4, wherein the operational constraint includes a navigational constraint and a data capture constraint for the mobile automation apparatus.

6. A control server in a mobile automation system including a mobile automation apparatus, the control server comprising:
    a memory storing (i) respective identifiers for a plurality of sub-regions in a facility, (ii) for each sub-region identifier, a location of the sub-region in the facility, and (iii) for each sub-region identifier, an operational constraint associated with the mobile automation apparatus;
    a job preprocessor configured to obtain a job definition indicating a set of the sub-region identifiers and a task to be performed;
    a fragment generator configured to:
        retrieve the locations and the operational constraints corresponding to the set of sub-region identifiers from the repository;
        allocate the set of sub-region identifiers to a plurality of subsets of sub-region identifiers, each subset having a shared common operational constraint;
        for each subset of sub-region identifiers, generate a task fragment containing the subset of sub-region identifiers, and the common operational constraint; and
    a dispatcher configured to send the task fragments and an identifier of the task to the mobile automation apparatus for performance of the task at each of the set of sub-region identifiers,
    wherein the control server is configured to, responsive to sending the task fragments, receive status data from the mobile automation apparatus indicating whether the task was successfully performed for each of the set of sub-region identifiers, and repeat the allocating, the generating, and the sending for any sub-region identifiers for which the task was not successfully performed.

7. The control server of claim 6, the memory further storing:

(i) respective identifiers for a plurality of regions in the facility;
(ii) for each region identifier, a plurality of the sub-region identifiers;
(iii) a plurality of post-processing tasks and, for each post-processing task, a corresponding task to be performed by the mobile automation apparatus the job preprocessor configured to obtain the job definition by:
 receiving the job definition containing a region identifier and a post-processing task;
 retrieving the set of sub-region identifiers corresponding to the region identifier; and
 retrieving the task corresponding to the post-processing task.

8. The control server of claim 6, wherein the task comprises a data capture task; and wherein the operational constraint includes a navigational constraint and a data capture constraint for the mobile automation apparatus.

* * * * *